(12) United States Patent
McCarthy

(10) Patent No.: US 8,231,066 B2
(45) Date of Patent: Jul. 31, 2012

(54) VEHICLE RECOVERY AND TRACTION LADDER

(75) Inventor: Bradley John McCarthy, Northgate (AU)

(73) Assignee: Paula Rachel Lange and Julie-Anne McCarthy (AU)

( * ) Notice: Subject to any disclaimer, the term of this patent is extended or adjusted under 35 U.S.C. 154(b) by 481 days.

(21) Appl. No.: 12/065,118

(22) PCT Filed: Oct. 13, 2006

(86) PCT No.: PCT/AU2006/001516
§ 371 (c)(1),
(2), (4) Date: Feb. 28, 2008

(87) PCT Pub. No.: WO2007/041802
PCT Pub. Date: Apr. 19, 2007

(65) Prior Publication Data
US 2008/0217077 A1    Sep. 11, 2008

(30) Foreign Application Priority Data
Oct. 14, 2005 (AU) ................................ 2005905683

(51) Int. Cl.
*E01B 23/00* (2006.01)
(52) U.S. Cl. ........................................................ 238/14
(58) Field of Classification Search ................ 238/14, 238/10 R, 11
See application file for complete search history.

(56) References Cited

U.S. PATENT DOCUMENTS

| 3,640,459 A |   | 2/1972 | Preisler |
|---|---|---|---|
| 4,210,280 A | * | 7/1980 | Reisner ............................ 238/14 |
| 4,993,768 A | * | 2/1991 | Ewen .............................. 294/51 |
| 5,439,171 A |   | 8/1995 | Fruend |
| 5,486,027 A | * | 1/1996 | Dionne et al. .................. 294/51 |
| 5,538,183 A | * | 7/1996 | McGee ........................... 238/14 |
| 6,394,362 B1 | * | 5/2002 | Kramr ............................ 238/14 |
| 6,779,738 B1 | * | 8/2004 | Stannard ........................ 238/14 |
| 6,933,036 B2 | * | 8/2005 | Whitaker ...................... 428/141 |

FOREIGN PATENT DOCUMENTS
CA          2137486          6/1996

* cited by examiner

*Primary Examiner* — S. Joseph Morano
*Assistant Examiner* — R. J. McCarry, Jr.
(74) *Attorney, Agent, or Firm* — Galbreath Law Offices, P.C.; John A. Galbreath

(57) ABSTRACT

A lightweight vehicle ladder for the recovery and traction of vehicles includes a central recessed portion (48) bordered by longitudinal strengthening ribs (56) and ramps (55) at either end. A plurality of traction members (52), each of which terminates in an upper tire engagement member (54) are disposed within the recessed portion and thereby somewhat protected from the ingress of mud during use in order that traction may be maintained. The underside and topside of the vehicle are formed with complementary shapes in order that a number of the ladders may be stacked one on top of the other to form a laminate of increased strength for application with particularly heavy vehicles.

15 Claims, 4 Drawing Sheets

VEHICLE RECOVERY AND TRACTION LADDER

The present invention relates to a vehicle support or "ladder" for a vehicle.

Vehicle ladders find a variety of applications. Permanently or temporarily fixed ladders have been used to form vehicle tracks on soft or unprepared road bases. For example, over soft sand or other soft terrain, the National Park authority forms tracks using laterally fixed timber lengths, so called "timber corduroy tracks". Similar constructions are often used for boat ramps and other soft or slippery vehicle paths where traction is an issue. Corduroy tracks are relatively high maintenance requiring the timber lengths to be regularly replaced. In addition corduroy tracks require a relatively large quantity of timber, only a relatively small quantity of which is actually used to support vehicles.

Vehicle ladders also find use as recovery equipment for providing improved traction in a form that can be placed in front of a vehicle's tyre to enable the vehicle to extricate itself from mud or soft sand. Examples of recovery ladders include sand ladders formed from lengths of aluminum or steel with holes pierced therethrough. This type of sand ladder is generally heavy and difficult to place in front of a tyre. In addition, in wet or muddy terrain these ladders provide little or no traction.

Other metal ladders have been formed from expanded mesh such as is used to form high grip walkways. However, such expanded mesh is generally deformed when used for the recovery of a 4WD, i.e. four-wheel-drive, vehicle. This is generally because in order for such a ladder to have sufficient strength to support a 4WD repeatedly it needs to be of a gauge that would render it too heavy for ready positioning in front of the wheels of a vehicle.

Fibreglass gratings have also been used. However, wheel spin on this type of plastic grating generally results in the grating being heat effected, either in melting by friction the top surface of the grating or causing the grating to plastically deform.

An articulated series of plastic ribbed members that is light weight has been tried but provides little support for a vehicle.

Embodiments of the present invention provide a ladder for supporting a vehicle and providing traction that is light weight and cost effective or at least provides the user with a useful or commercial choice.

SUMMARY OF THE INVENTION

According to a first aspect of the invention there is provided a vehicle ladder including an elongate body having a topside into which a recessed portion is formed; and a plurality of traction members extending from a floor of the recessed portion.

In a preferred embodiment opposing longitudinal strengthening ribs are provided to imparting stiffness. The longitudinal strengthening ribs are preferably provided in the form of elongate trapezoidal sections. Braces may be formed across the underside of the longitudinal strengthening ribs in order to increase the strengthening ribs resistance to deformation due to the weight of a vehicle.

Preferably a skirt is formed about a perimeter of the ladder to assist in supporting the ladder in use. The skirt may have a perimeter that is non-linear, such as a serrated perimeter for example, in order to increase the ground traction.

In order that the vehicle ladder may be readily handled and put into place it is preferable that it be formed with handholds. Similarly, the skirt may include a number of peg holes to assist in pegging the ladder to the ground in use for increased traction. The apertures and holes through the support may provide a convenient fixing point with which to attach the vehicle ladder to a vehicle for transport, either on a roof rack or on a rear mounted spare wheel.

In a preferred embodiment the recessed portion is at least partly defined by the opposing longitudinal strengthening ribs. The strengthening ribs may extend longitudinally along the vehicle ladder to provide structural rigidity to the vehicle ladder and assist in strengthening. The strengthening ribs may be in the form of an inverted channel or a tubular section generally dependent upon the manufacturing technique used to produce the vehicle ladder. The strengthening ribs may include internal bracing to reduce distortion of the ribs under load. The strengthening ribs may form part of the upper driving surface and optionally also include one or more of the tread engaging projections for engaging with channels in a vehicle tyre tread pattern whereby the traction of the vehicle is enhanced.

In such an embodiment the upper surface of the strengthening ribs will be at about the height of the traction members.

Ramps may be formed at opposing ends for a vehicle wheel to roll onto, or off, said ladder in use. In the preferred embodiment the sides of the recess are defined by the opposing longitudinal strengthening ribs and ends of the recess are defined by the ramps.

Preferably the vehicle ladder includes a plurality of tread engaging projections extending from the topside which may be elongate and orientated non-parallel to a long-axis of the vehicle ladder. For example, they may be orientated at substantially ninety degrees, or forty-five degrees, to the long-axis in order to correspond to the tread pattern of a vehicle tire. The tread engaging projections are preferably disposed on upper surfaces of the traction members, strengthening ribs and ramps.

In a preferred embodiment the vehicle ladder is formed of a material of substantially constant thickness. The vehicle ladder may be formed from a variety of materials. For example, the vehicle ladder may be formed from timber, metal or plastic. The vehicle ladder is preferably formed from plastics materials in due to the ability of plastics materials to provide a lightweight yet tough support for the vehicle. The vehicle ladder may be formed by injection moulding, preferably of a granulated fibre reinforced nylon compound.

An injection moulded vehicle ladder may be formed as a stackable component. So as to be stackable, the ribs extending longitudinally may be trapezoidal, and the traction members may be frustoconical. In addition to providing stackability, the inventor has found that such a configuration provides a vehicle ladder with increased strength.

The thickness of the vehicle ladder will depend on the materials of construction and the production process. The inventor has found that a suitable height is in the range of from 50 mm to 120 mm. Preferably the height of the vehicle ladder will be approximately 75 mm.

The thickness of an injection moulded vehicle ladder is preferably about 8 mm although the thickness will depend on the materials of construction and the anticipated weight of the vehicle.

Preferably the vehicle ladder is formed with an underside of a shape complementary to the topside in order that two or more of the vehicle ladders can be stacked one on top of the other. Stacking the ladders to form a lamination of them results in a composite ladder of increased strength which may be advantageous for use with particularly heavy vehicles.

Temporary applications of the vehicle ladder of the present invention preferably include vehicle recovery whereby the vehicle ladder is placed under or in front of a wheel of a vehicle whereby the wheel can gain traction on the ladder and advance the vehicle. Other temporary applications of the vehicle ladder include providing a temporary ramp for a vehicle to traverse, so that an approach angle or departure angle can be reduced to within the range of the vehicle.

The vehicle ladder of the present invention comprises a stiff vehicle ladder. It will be understood that the term "stiff" is used herein to refer to the ability of the vehicle ladder to bear the weight of the vehicle without undue deformation. It will be appreciated that the vehicle ladder may flex to a limited degree and not be completely rigid but that the vehicle ladder should be sufficiently stiff so that the vehicle ladder does not simply deform about the wheel of the vehicle or to the shape of the terrain.

The vehicle ladder of the present invention may be dimensioned to any suitable size and is based upon the intended application. In fixed applications the vehicle ladder is preferably of sufficient width to enable a variety of vehicles to traverse the ladder. Each vehicle ladder that may be spaced apart to form a track should be sufficiently broad in size to enable a variety of vehicles to traverse the ladder, with its left and right wheels supported upon the ladders. The length of the vehicle ladder in fixed applications maybe any convenient length as such applications will be generally constructed with machinery that will enable the lifting and manipulation of substantial sections and weight is not a critical problem. Preferably the length of the vehicle ladder will be selected so that the vehicle ladder can be used to form tracks having a desired curvature.

In order that the invention may be more fully understood and put into practice, preferred embodiments thereof will now be described with reference to the accompanying drawings.

DETAILED DESCRIPTION OF EXEMPLARY EMBODIMENT

Figure 1:
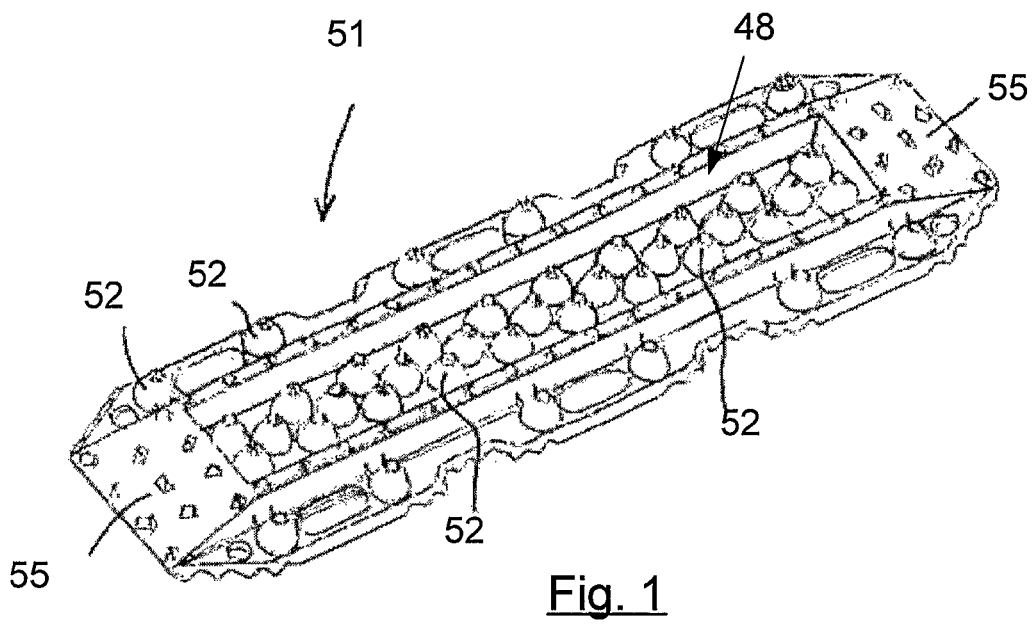
FIG. 1 shows a perspective top view of a vehicle ladder according to a preferred embodiment of the present invention.
Figure 2:
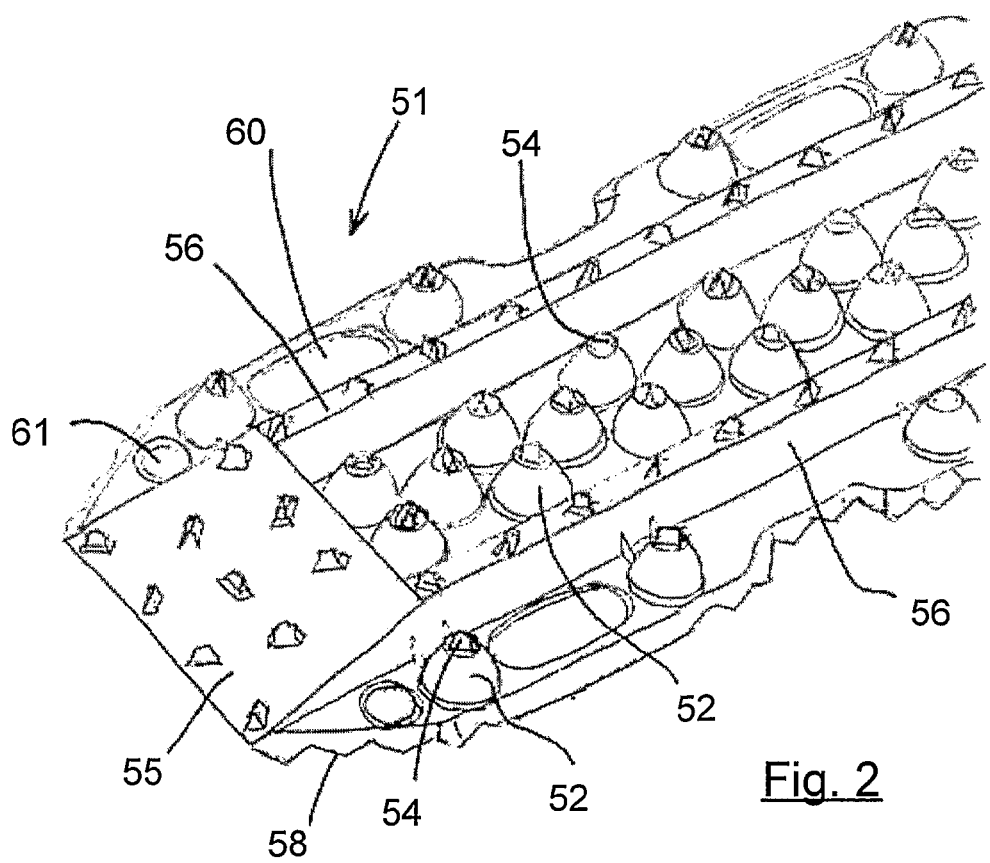
FIG. 2 shows an enlarged view of one end of the vehicle ladder shown in FIG. 1.
Figure 3:
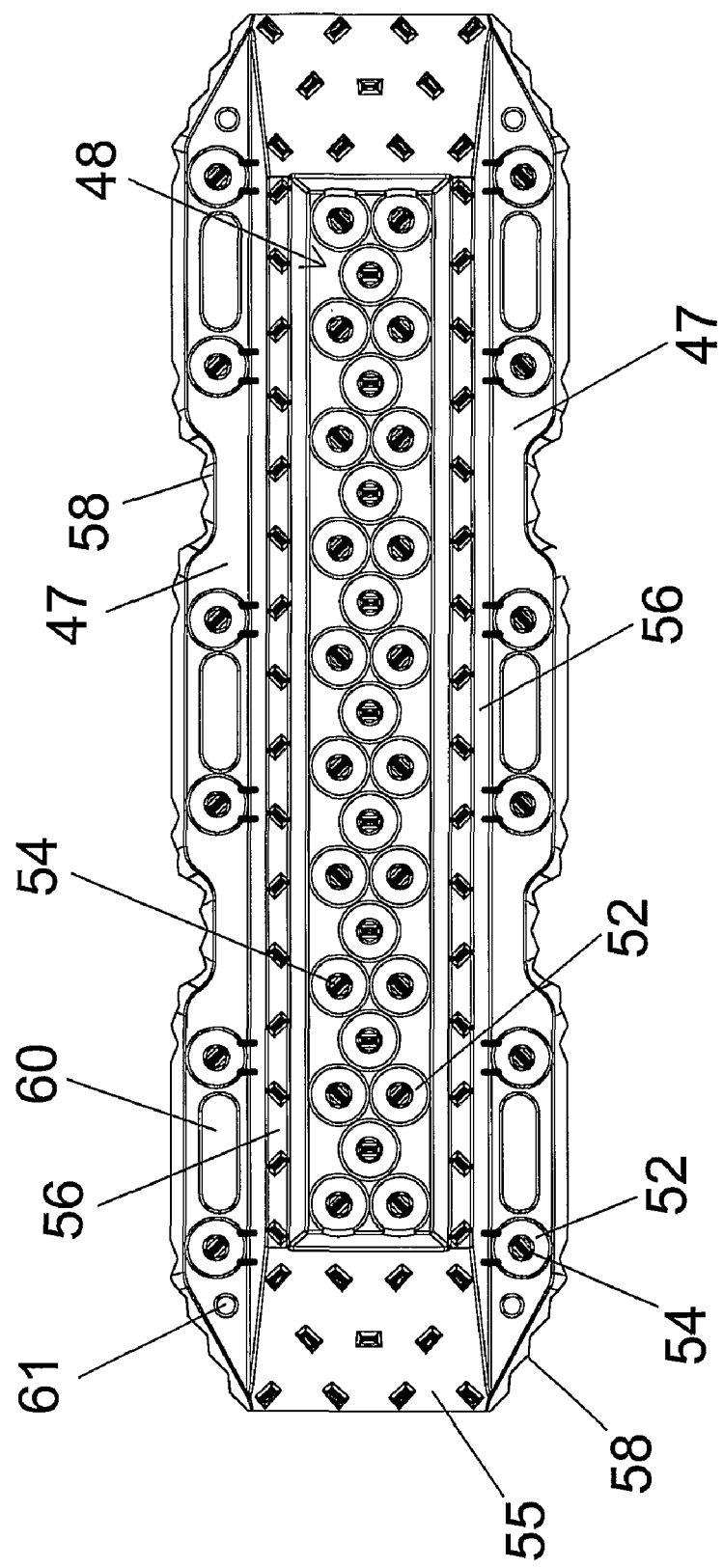
FIG. 3 shows a plan view of a topside of the vehicle ladder of FIG. 1.
Figure 4:
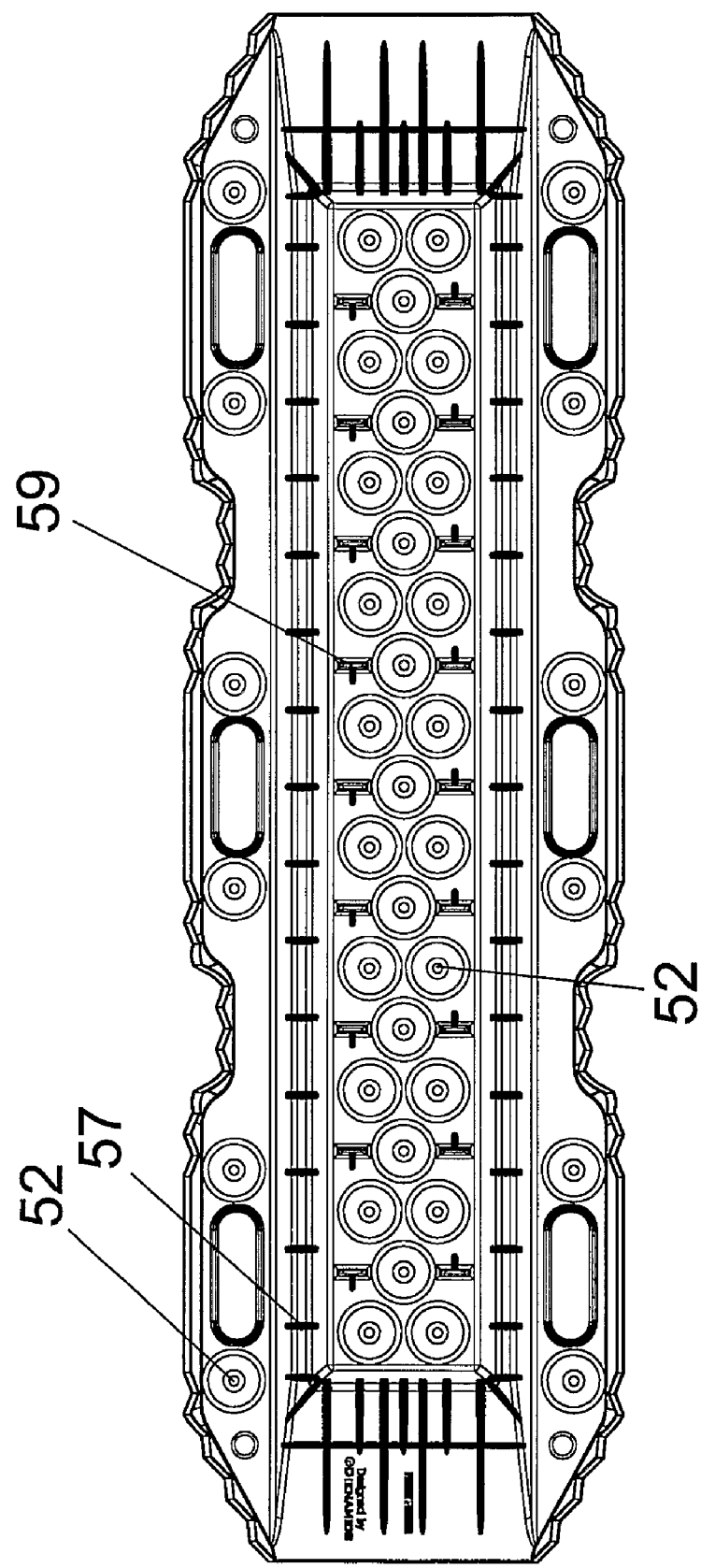
FIG. 4 shows a plan view of an underside of the vehicle ladder of FIG. 1.

FIGS. 1 to 4 show an elongate vehicle ladder 51 in accordance with a preferred embodiment of the present invention. The vehicle ladder 51 has a long axis in which direction a vehicle's wheels are intended to roll in use. Ladder 51 has a topside into which a recessed portion 48 is formed. A plurality of traction members 52 extend from the floor of the recessed portion to support a vehicle tire in use. Other traction members are disposed along the outside edges of the vehicle ladder. The traction members 52 are frustoconical in shape with the traction members in the recessed portion of the vehicle ladder 51 being arranged in an array of rows and ranks. In the present embodiment, each row and each rank includes a triplet of traction members 52. There is further provided a pair of parallel rows of traction members 52 which are each located along either side of the vehicle ladder 51.

At the tip of the traction members 52 extend respective projections 54 that comprise tread engaging members and are dimensioned to fit within a vehicle tyre tread channel.

The tread engaging members 54 are disposed generally at 90 and 45 degrees to the longitudinal axis of the vehicle ladder which is substantially in accordance with the channels of vehicle tyre tread patterns used in off-road vehicle applications such as 4WDs, quad-bikes and the like. Each pair of adjacent projections 54 in any given row or rank preferably have a different orientation.

The vehicle ladder 51 includes ramps 55 at either end. A pair of strengthening ribs in the form of elongate trapezoidal sections 56 extend along the vehicle ladder 51 between the ramps 55. The trapezoidal sections 56 enhance the stiffness of the vehicle ladder 51. The trapezoidal sections 56 extend longitudinally along the vehicle ladder 51 and include braces 57 spaced at regular intervals there-along so as to reduce the flattening effect of a heavy vehicle resting on the trapezoidal sections 56.

The ramps and strengthening ribs, which in the present embodiment define the recess 48 tend to act as a barrier to mud and water entering the recess and building up around the traction members, and ultimately the tread engaging members, which would result in a reduction of tire traction during use.

The sides of the vehicle ladder 51 include a skirt 47 that runs along the outside of the strengthening ribs, and has edge sections 58 that have been serrated so that they are non-linear in order to increase the perimeter length of the vehicle ladder to thereby enhance ground traction. The underside of the vehicle ladder includes projections 59 that are adapted to engage the ground and further enhance the traction between the vehicle ladder 51 and the ground.

The vehicle ladder 51 also includes slotted apertures 60 that are used for hand holds so that the vehicle ladder can be easily manipulated by a user. Apertures 61 provide attachment points for the vehicle ladder 51. These apertures 61 facilitate tying the vehicle ladder 51 to a fixed object such as a tree (or an adjacent vehicle ladder 51) using rope. The vehicle ladder 51 may also be pegged to the ground by inserting pegs through the apertures 61.

Tread engaging members 54 are further provided which extend from the ramps 55 and trapezoidal sections 56 to facilitate the gripping of a vehicle tyre. Two or more vehicle ladders 51 may be stacked together so as to form a support of increased stiffness.

Figure 5:
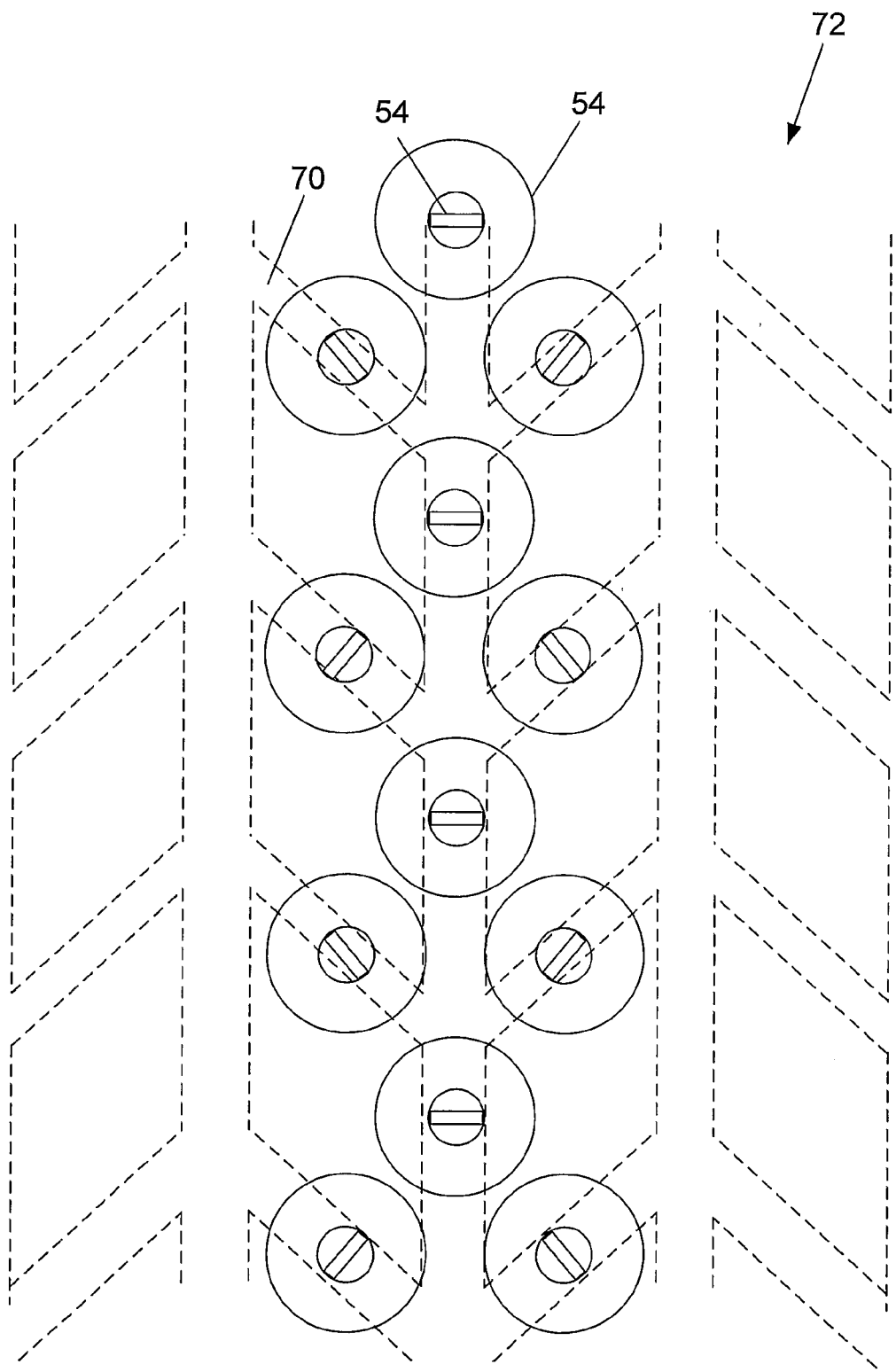
FIG. 5 shows a plan view of a tyre track which is superimposed on various traction members of the vehicle ladder of FIG. 1.

FIG. 5 shows a plan view of a planar tyre track 72 (shown in dashed lines) which is superimposed on the vehicle ladder of FIG. 1. The location of a number of traction members 52 with respect to the tyre track is shown.

In use, tread engaging members 54 are received within tyre channels 70 to thereby enhance tyre traction.

Typically, not all of the tread engaging members 54 will engage with a channel 70. However, at least some of the tread engaging members 54 typically engage with a channel 70 whilst others engage with the contact face of the tyre in which the channels 70 are defined.

Vehicle ladder 51 is formed as a stackable component. As previously mentioned the strengthening ribs 56 are trapezoidal in cross section, and the traction members 52 are frustoconical so that a number of similar vehicle ladders may be stacked on top of each other. In addition to providing stackability, the inventor has found that such a configuration provides a vehicle ladder with increased strength.

The thickness of a vehicle ladder according to the present invention will depend on the materials of construction and the production process. The inventor has found that a suitable height is in the range of from 50 mm to 120 mm. Preferably the height of the vehicle ladder will be approximately 75 mm.

The thickness of an injection moulded vehicle ladder is preferably about 8 mm although the thickness will depend on the materials of construction and the anticipated weight of the vehicle.

The use of the vehicle ladder 51 will now be described. In the event that a vehicle loses traction on slippery terrain, the vehicle may be stopped and one or more vehicle ladders 51 can be removed from stowage areas such as the boot, or roofrack, of the vehicle. The vehicle ladders 51 are relatively light and can be carried by placing a hand through a slotted aperture 60.

A vehicle ladder 51 can be placed under each wheel which is slipping. The vehicle ladder 51 is thrust axially under the wheel so as to jam a ramp 55 between the tyre and the ground. The vehicle ladder 51 may be further laterally reciprocated and pushed beneath the tyre to as to cause the serrated edges 58 to dig into the ground for increased stability. Pegs may then be received in one or more apertures 61 to hold the vehicle ladder 51 fast with respect to the ground.

The user can then return to his vehicle and slowly drive up the ramp 55 and along the vehicle ladder 51.

As discussed previously, for improved strength, a pair of vehicle ladders 51 may be stacked together and placed beneath a slipping wheel in accordance with the foregoing procedure.

Persons skilled in the art will appreciate that the invention described above may be subject to improvements and modifications that will be apparent without departing from the spirit and scope of the invention as set out in the following claims.

The invention claimed is:

1. A vehicle traction mat for increasing the traction of a vehicle tire, including:
   an elongate body having a topside into which a recessed portion is formed;
   and a plurality of frustoconical traction members extending from a floor of the recessed portion,
   wherein tire tread engaging projections are located on the top surfaces of the frustoconical traction members, said top surfaces being substantially flat across the extent of the frustoconical traction members, from one side to the other, except for said tire tread engaging projections, and said tire tread engaging projections are elongate in shape and oriented at substantially ninety degrees or forty-five degrees to the long-axis of the traction mat.

2. A vehicle traction mat according to claim 1, including opposing longitudinal strengthening ribs for imparting stiffness.

3. A vehicle traction mat according to claim 2, wherein the longitudinal strengthening ribs are in the form of elongate trapezoidal sections.

4. A vehicle traction mat according to claim 1, wherein the longitudinal strengthening ribs include braces.

5. A vehicle traction mat according to claim 1, including a skirt formed about a perimeter of the traction mat to support the traction mat in use.

6. A vehicle traction mat according to claim 5, wherein the skirt has a perimeter that is non-linear.

7. A vehicle traction mat according to claim 6, wherein the skirt is formed with handholds.

8. A vehicle traction mat according to claim 6, wherein the skirt is formed with peg holes.

9. A vehicle traction mat according to claim 2, wherein the recessed portion is partly defined by the opposing longitudinal strengthening ribs.

10. A vehicle traction mat according to claim 2, including ramps formed at opposing ends for a vehicle wheel to roll onto, or off, said traction mat in use.

11. A vehicle traction mat according to claim 10, wherein sides of the recess are defined by the opposing longitudinal strengthening ribs and ends of the recess are defined by the ramps.

12. A vehicle traction mat according to claim 1, wherein the tire tread engaging projections are located on upper surfaces of the traction members, strengthening ribs and ramps.

13. A vehicle traction mat according to claim 1, formed of a material of substantially constant thickness.

14. A vehicle traction mat according to claim 1, formed by a plastic injection molding process.

15. A vehicle traction mat according to claim 1, having an underside of a shape complementary to the topside in order that two or more of the vehicle traction mats are stackable one on top of the other.

* * * * *